(12) United States Patent
Miyata et al.

(10) Patent No.: US 10,826,031 B2
(45) Date of Patent: Nov. 3, 2020

(54) GASKET FOR ALKALINE BATTERY AND METHOD FOR MANUFACTURING SAME

(71) Applicant: Shinsei Kagaku Kogyo Co., Ltd., Otsu-shi, Shiga (JP)

(72) Inventors: Yoichi Miyata, Otsu (JP); Minoru Horii, Takashima (JP); Hideyuki Hachiken, Takashima (JP)

(73) Assignee: Shinsei Kagaku Kogyo Co., Ltd., Otsu-shi (JP)

( * ) Notice: Subject to any disclaimer, the term of this patent is extended or adjusted under 35 U.S.C. 154(b) by 0 days.

(21) Appl. No.: 15/746,457

(22) PCT Filed: Nov. 22, 2017

(86) PCT No.: PCT/JP2017/042010
§ 371 (c)(1),
(2) Date: Jan. 22, 2018

(87) PCT Pub. No.: WO2018/185971
PCT Pub. Date: Oct. 11, 2018

(65) Prior Publication Data
US 2020/0091471 A1 Mar. 19, 2020

(30) Foreign Application Priority Data
Apr. 7, 2017 (JP) .................. 2017-076497

(51) Int. Cl.
*H01M 2/08* (2006.01)
*H01M 10/24* (2006.01)

(52) U.S. Cl.
CPC ............. *H01M 2/08* (2013.01); *H01M 10/24* (2013.01)

(58) Field of Classification Search
CPC ........ H01M 4/131; H01M 4/505; H01M 2/08; H01M 10/24
(Continued)

(56) References Cited

U.S. PATENT DOCUMENTS 5,272,020 A    12/1993    Flack
5,776,631 A    7/1998    Wu
(Continued)

FOREIGN PATENT DOCUMENTS

CN    104425777    3/2015
EP    0107267    5/1984
(Continued)

OTHER PUBLICATIONS

International Search Report and Written Opinion for International Application No. PCT/JP2017/042010 dated Jan. 16, 2018, 6 pages.
(Continued)

*Primary Examiner* — James M Erwin
(74) *Attorney, Agent, or Firm* — Amin, Turocy & Watson, LLP

(57) ABSTRACT

The present invention provides a gasket for an alkaline battery which enables such a long lifetime that liquid leakage due to carbides of a polyamide resin raw material does not occur, surface wrinkles are hardly generated because of excellent fluidity during molding, and a thin wall portion serving as an explosion-proof safety valve can be normally ruptured until the lifetime of an alkaline battery expires, and a method for manufacturing the same. The gasket for an alkaline battery is formed by injection molding a resin composition, and has a thin wall portion in part. The resin composition is a polyamide 610 resin composition containing a polyamide 610 resin as a main component and a molding aid such as a release agent and a crystal nucleating agent, the polyamide 610 resin having a viscosity number in a range of 80 ml/g or more and 145 ml/g or less.

4 Claims, 2 Drawing Sheets

(58) Field of Classification Search
USPC .................................................. 429/223, 129
See application file for complete search history.

(56) References Cited

U.S. PATENT DOCUMENTS

| | | | |
|---|---|---|---|
| 8,900,745 | B2 | 12/2014 | Lee et al. |
| 2002/0127470 | A1 | 9/2002 | Syvertsen et al. |
| 2003/0152831 | A1 | 8/2003 | Davidson et al. |
| 2003/0182791 | A1 | 10/2003 | Janmey |
| 2006/0083985 | A1 | 4/2006 | Dunham |
| 2013/0023613 | A1* | 1/2013 | Klatt ...................... C08L 77/02 524/255 |
| 2013/0065096 | A1 | 3/2013 | Daniel-Ivad |
| 2013/0150517 | A1* | 6/2013 | Tarbit ...................... C08L 35/02 524/502 |

FOREIGN PATENT DOCUMENTS

| | | |
|---|---|---|
| JP | 09-027305 | 1/1997 |
| JP | 2001-351586 | 12/2001 |
| JP | 2007-080574 | 3/2007 |
| JP | 2008-222920 | 9/2008 |
| JP | 2008-280514 | 11/2008 |
| JP | 2009-021263 | 1/2009 |
| JP | 2009-032639 | 2/2009 |
| JP | 2009-215514 | 9/2009 |
| JP | 2009-263503 | 11/2009 |
| JP | 2010-031210 | 2/2010 |
| JP | 2010-073502 | 4/2010 |
| JP | 2015-026477 | 2/2015 |
| JP | 2016-098240 | 5/2016 |
| WO | 2010/041327 | 4/2010 |

OTHER PUBLICATIONS

Extended European Search Report for European Patent Application No. 17875059.2 dated Oct. 8, 2019.

* cited by examiner

GASKET FOR ALKALINE BATTERY AND METHOD FOR MANUFACTURING SAME

TECHNICAL FIELD

The present invention relates to a resin gasket for an alkaline battery used in an alkaline battery and a method for manufacturing the same.

BACKGROUND ART

Alkaline batteries are widely used from the past as a disposable power source which can be used while being carried upon using toys, flashlights and other electric and electronic equipment. Alkaline batteries are provided with gaskets for insulating an anode from a cathode. In general, as a gasket, an inexpensive polyamide 66 resin as a raw material which is molded into a desired shape by injection molding method is used (Patent Document 1).

Also, as one of the problems required for alkaline batteries, alkaline batteries are required to have a long lifetime. It is known that it is necessary to prevent a gasket from being deteriorated by a strongly alkaline electrolytic solution in order to realize a long lifetime. For example, a gasket including a polyamide 610 resin or a polyamide 612 resin has been proposed as a gasket that can be suppressed to be deteriorated due to an electrolytic solution (Patent Document 2).

Incidentally, it is known that when an alkaline battery is discharged, a reaction gas is generated in its battery can. If the internal pressure of the battery increases due to the generated gas, the battery may rupture. In view of this, as disclosed in Patent Document 1, there is also proposed a gasket in which a thin wall portion functioning as an explosion-proof safety valve is formed in a part of a gasket so as to prevent rupture of the battery main body. This thin wall portion is configured to be torn when the internal pressure of the battery reaches a certain pressure or more.

However, when a polyamide resin composition containing a polyamide resin having a high molecular weight as a main component is used in the process of preparing a gasket through injection molding method, it is poor in fluidity, so that the appearance defect called surface wrinkles occurs in a circumference of the thin wall portion serving as an explosion-proof safety valve. When the surface wrinkles are generated in the thin wall portion, the explosion-proof safety valve may be operated because of the surface wrinkles, which is one of the causes of shortening the lifetime of a battery.

As a method for eliminating surface wrinkles, a method can be considered in which the melting temperature of the polyamide resin composition is increased to improve the fluidity of the resin. In particular, a polyamide resin composition composed of a polyamide resin having a high molecular weight cannot resolve the problem of the surface wrinkles unless the melting temperature is raised considerably. However, if the melting temperature is raised until the surface wrinkles are eliminated, the degradation of the polyamide resin composition is accelerated and generation of carbides becomes noticeable. When the carbides generated in the gasket manufacturing process remain in the thin wall portion, liquid leakage may occur due to the carbide before an alkaline battery reaches its lifetime.

CITATIONS LIST

Patent Documents

Patent Document 1: JP 2001-351586 A
Patent Document 2: JP 2015-26477 A

SUMMARY OF INVENTION

Technical Problems

The present invention has been made in view of the above problems, and an object of the present invention is to provide a gasket for an alkaline battery which enables such a long lifetime that liquid leakage due to carbides of a polyamide resin raw material does not occur and liquid leakage does not occur until the lifetime of an alkaline battery expires, and a method for manufacturing the same.

Solutions to Problems

As a result of intensive studies, the present inventors have found that in a polyamide 610 resin composition having high resistance to an alkaline electrolytic solution, there is such a range of the viscosity number of the polyamide 610 resin that fluidity is good even when the polyamide 610 resin is melted and injection-molded at a temperature at which no carbide is generated, and the mechanical properties required for an alkaline battery can be satisfied, and the present inventors have identified the range of the viscosity number, thereby completing the present invention.

In addition, a runner discharged when producing the gasket including the polyamide 610 resin composition having a specified viscosity number range can be a regenerated material by pulverizing the runner to a size of pellet. Then, it has also been found that a gasket obtained by mixing the regenerated material with the polyamide 610 resin composition having a specified viscosity number range and subjecting the mixture to injection molding can be also suited as the gasket of the present object. Furthermore, it has also been found that mechanical properties required for alkaline batteries can be satisfied even when using regenerated materials that are repeatedly regenerated twice or more.

A gasket for an alkaline battery according to the present invention is a gasket for an alkaline battery, the gasket being formed by injection molding a resin composition and having a thin wall portion in part, in which the resin composition is a polyamide 610 resin composition containing a polyamide 610 resin as a main component and a molding aid such as a crystal nucleating agent and a release agent, the polyamide 610 resin having a viscosity number (a value obtained by measuring a solution obtained by dissolving the polyamide 610 resin to 96% sulfuric acid as a solvent so that the polyamide 610 resin concentration is 1%, and calculating the measurement value according to the ISO 307 standard (JIS K 6933)) in a range of 80 ml/g or more and 145 ml/g or less.

In the polyamide 610 resin composition constituting the gasket for an alkaline battery, it is preferred to use partially a regenerated material of the same kind of a polyamide 610 resin composition once used for injection molding or to use a whole of the regenerated material as a material. Further, the regenerated material can be a regenerated material used for injection molding twice or more.

A method for manufacturing a gasket for an alkaline battery, the gasket having a thin wall portion in part, includes injection molding, into the gasket, a polyamide 610 resin composition containing a polyamide 610 resin as a main component and a molding aid such as a crystal nucleating agent and a release agent, the polyamide 610 resin having a viscosity number (a value obtained by measuring a solution obtained by dissolving the polyamide 610 resin to 96% sulfuric acid as a solvent so that the polyamide 610 resin concentration is 1%, and calculating the measurement value according to the ISO 307 standard (JIS K 6933)) in a range of 80 ml/g or more and 145 ml/g or less.

When the gasket for an alkaline battery is manufactured, the polyamide 610 resin composition has a molten resin temperature during injection molding of preferably 250 to 280° C. in order to avoid the generation of carbides due to resin degradation while ensuring a melt viscosity not causing surface wrinkles in the thin wall portion. Furthermore, when the gasket for an alkaline battery is manufactured, the polyamide 610 resin composition is preferred since it has the effect of reducing a waste product by using partially a regenerated material of the same kind of a polyamide 610 resin composition once used for injection molding or using a whole of the regenerated material as a material.

Advantageous Effects of Invention

As described above, the gasket for an alkaline battery of the present invention is prepared by injection molding method using, as a material, a PA 610 resin composition whose main component is a polyamide 610 resin (hereinafter referred to as PA 610 resin) having a viscosity number in a range of 80 ml/g or more and 145 ml/g or less, and therefore it is possible to provide an alkaline battery that satisfies long lifetime and mechanical properties required for alkaline batteries and that does not cause liquid leakage due to poor quality of the gaskets such as carbides and surface wrinkles. Specifically, in the gasket for an alkaline battery of the present invention, even when the PA 610 resin composition is melted and injection-molded at an appropriate temperature at which no carbide is generated, the fluidity of the PA 610 resin composition at the time of molding is excellent, and therefore surface wrinkles are hardly generated. In addition, since the gasket for an alkaline battery of the present invention does not produce carbides, it does not cause liquid leakage due to the carbides, and also satisfies mechanical properties. As a result, in the gasket for an alkaline battery of the present invention, since the thin wall portion serving as an explosion-proof safety valve can be normally ruptured until the lifetime of the alkaline battery expires, the lifetime of the gasket can be prolonged.

DESCRIPTION OF EMBODIMENTS

Hereinafter, embodiments of the present invention will be described with reference to the accompanying drawings.

Figure 1:
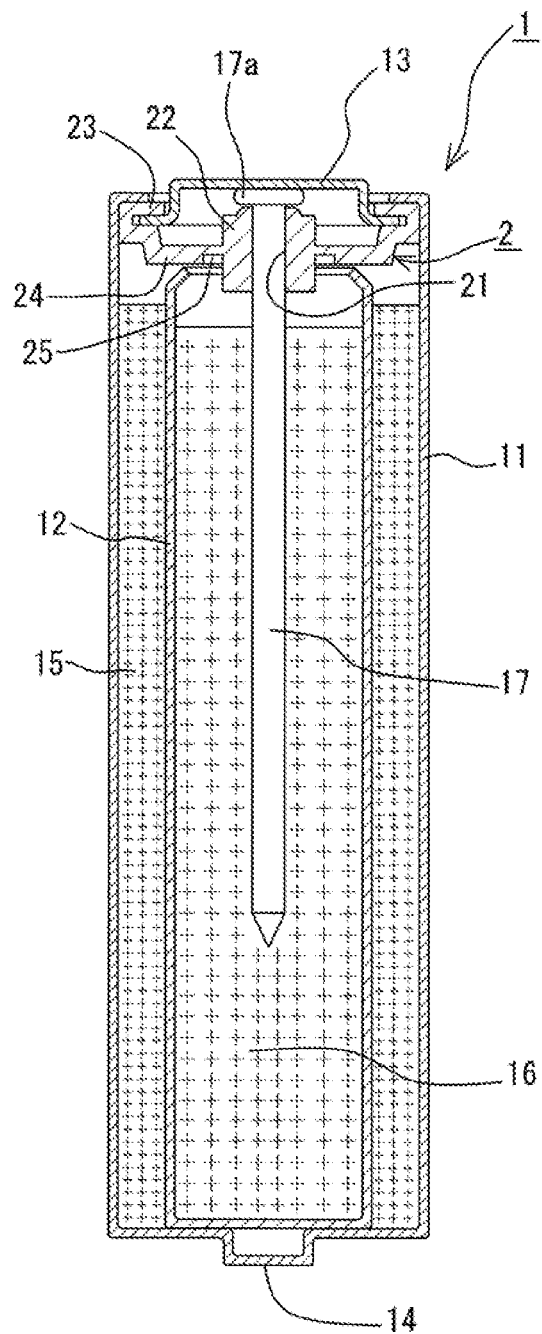
FIG. 1 is a schematic cross-sectional view of a state in which a gasket for an alkaline battery according to the present embodiment is incorporated in an alkaline battery.

FIG. 1 is a cross-sectional view of a cylindrical alkaline battery 1 provided with a gasket 2 for an alkaline battery of the present embodiment. In the alkaline battery 1, a positive electrode material 15 containing manganese dioxide, which is previously molded into a cylindrical shape, is placed in a closed-end cylindrical positive electrode can 11 made of galvanized iron. Next, a tubular separator 12 is inserted into the inner diameter side of the positive electrode material 15. Furthermore, a mixture of an electrolytic solution containing a high concentration aqueous potassium hydroxide solution and a gelling agent, and a particulate negative electrode material 16 containing zinc is stored inside the separator 12.

A positive electrode terminal 14 protruding outward is formed at the center of a bottom surface of the positive electrode can 11. An opening of the positive electrode can 11 is covered with a disk-shaped negative electrode terminal 13 with the gasket 2 interposed between the positive electrode can 11 and the negative electrode terminal 13. The gasket 2 insulates the positive electrode can 11 from the negative electrode terminal 13, and seals a clearance between the opening of the positive electrode can 11 and the negative electrode terminal 13.

A current collector 17 obtained by molding brass into a nail shape and being galvanized is inserted in the negative electrode material 16. The current collector 17 is inserted into the negative electrode material 16 by penetrating a boss hole 21 formed at the center portion of the gasket 2, while a top surface of a head portion 17a at one end is connected to an inner surface of the negative electrode terminal 13 by welding.

Figure 2:
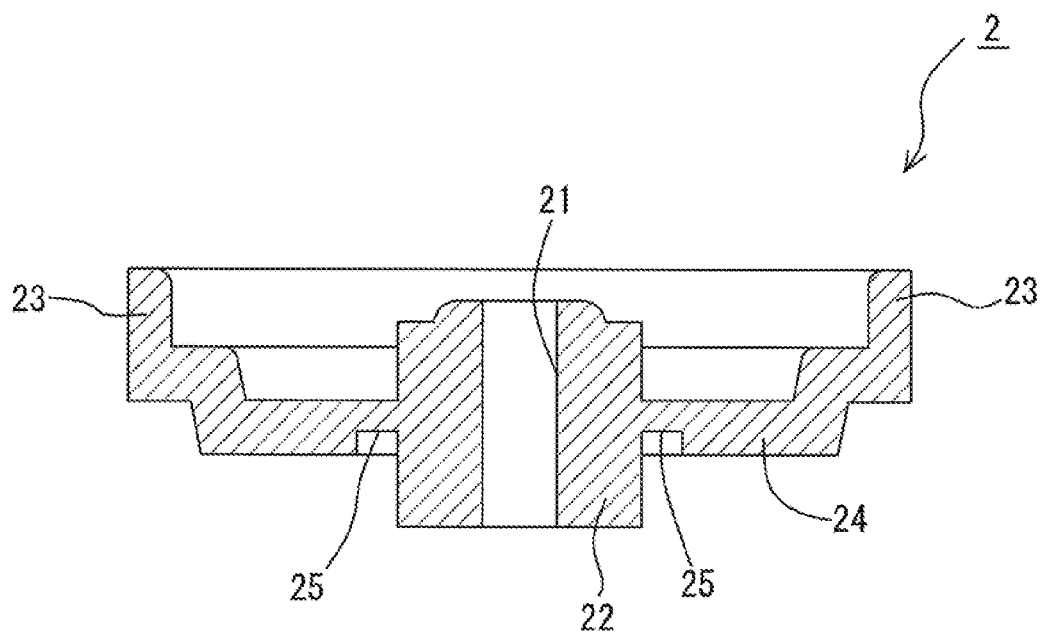
FIG. 2 is a cross-sectional view of the gasket for an alkaline battery according to the present embodiment before being incorporated in an alkaline battery.

The gasket 2 is molded by injection molding. As also shown in FIG. 2, the gasket 2 includes a cylindrical boss portion 22 having a boss hole 21, a disk-shaped isolation wall portion 24 connected to the outer peripheral surface of the boss portion 22 and extending radially outward, and a standing portion 23 formed upright on the entire circumference of the outer peripheral edge of the isolation wall portion 24. The current collector 17 is held in the boss portion 22 by being inserted into the boss hole 21 in a state of being press-fitted. Further, the standing portion 23 is inserted while the outer peripheral surface thereof is pressed against the inside of the opening of the positive electrode can 11.

The gasket 2 is inserted into the opening of the positive electrode can 11 in a state where the gasket 2 is disposed at an upper end portion of the separator 12. The gasket 2 is assembled between the positive electrode can 11 and the negative electrode terminal 13 by bending the opening end portion of the positive electrode can 11 inward with the negative electrode terminal 13 disposed on the isolation wall portion 24 of the gasket 2. Specifically, as shown in FIG. 1, the standing portion 23 of the gasket 2 is also bent by the bending of the positive electrode can 11, and the standing portion 23 is sandwiched between the opening end portion of the positive electrode can 11 and the outer peripheral edge of the negative electrode terminal 13. The positive electrode can 11 serving as a positive electrode is insulated from the negative electrode terminal 13 serving as a negative electrode by the standing portion 23.

Furthermore, a thin wall portion 25 is formed at the connecting portion between the isolation wall portion 24 and the boss portion 22 so as to rupture before the internal pressure of the battery rises higher than the caulking strength of the positive electrode can 11. The thin wall portion 25 has a function as an explosion-proof safety valve for preventing burst of the battery in advance.

The thin wall portion 25 is configured by a ring-shaped groove formed on the lower surface side of the connecting portion between the isolation wall portion 24 and the boss portion 22. Therefore, the thickness of the thin wall portion 25 is thinner than the thickness of the isolation wall portion 24 located outside the position where the thin wall portion 25 is formed. The wall surface of the groove forming the thin wall portion 25 is formed at a right angle or an acute angle with respect to the lower surface of the isolation wall portion 24 and has a shape which is easily ruptured by the battery internal pressure.

In the present embodiment, a portion adjacent to the thin wall portion 25 in the isolation wall portion 24 has a thickness of 0.6 to 1.0 mm and the thin wall portion 25 has a thickness of 0.4 mm or less. Preferably, the thin wall portion 25 has a thickness of 0.2 to 0.3 mm. A position of the thin wall portion 25 is not particularly limited as long as it exists in the isolation wall portion 24, and the position is not limited to the present embodiment. The thin wall portion 25 may be formed in a part of the isolation wall portion 24 apart from the boss portion 22.

The gasket 2 of the present embodiment is molded by injection molding a PA 610 resin composition containing, as a main component, a PA 610 resin whose viscosity number is in a range of 80 ml/g or more and 145 ml/g or less and containing a molding aid such as a crystal nucleating agent and a release agent. The PA 610 resin is a copolycondensation polymer of sebacic acid and hexamethylenediamine, and the polymerization method of the PA 610 resin is not particularly limited. The polymerization method of the PA 610 resin can include melt polymerization, interfacial polymerization, solution polymerization, bulk polymerization, solid phase polymerization, and a method combining these methods. Usually melt polymerization is preferably used.

Further, the PA 610 resin composition used in the present embodiment is a resin composition in which a crystal nucleating agent having a maximum particle diameter of 2.0 μm or less is added in an amount of 0.0001 to 5 parts by weight with respect to 100 parts by weight of the PA 610 resin. By using the PA 610 resin composition to which such a crystal nucleating agent is added, the gasket 2 having a tensile elongation of not more than a predetermined value can be obtained.

Examples of the crystal nucleating agent contained in the PA 610 resin composition used in the present embodiment include inorganic fine particles such as talc, calcined kaolin and magnesium silicate, metal oxides such as aluminum oxide, and fatty acid metal salts such as aluminum stearate. The crystal nucleating agent is added in the amount of 0.0001 to 5 parts by weight, and the maximum particle diameter thereof is 2.0 μm or less. If the maximum particle diameter exceeds 2.0 μm, the crystal grows largely, the elongation of the gasket becomes large, the safety valve operating pressure becomes high, and the thin wall portion hardly ruptures, which is not suitable for the purpose of the present invention. Among them, since fine crystals are stably formed, the size of the crystal nucleating agent is particularly preferably 1.0 μm or less. On the other hand, if the addition amount of the crystal nucleating agent is large, since the crystal nucleating agent itself shows a reinforcing effect and causes variation in the operating pressure of the explosion-proof safety valve, the addition amount of the crystal nucleating agent is in a range of 0.0001 to 5 parts by weight, and more preferably 3 parts by weight or less.

In addition, small amounts of additives such as a release agent and an antioxidant are added to the PA 610 resin composition of the present embodiment within a range which does not affect the battery function. Particularly, it is preferred to use a release agent in combination since it improves moldability. Examples of the release agent include long-chain alkyl fatty acid metal salts such as magnesium stearate, barium stearate and magnesium montanate, and long-chain alkyl fatty acid esters. The addition amount of the release agent is preferably 0.5 parts by weight or less, which does not affect the physical properties of the resin. A small amount of polyamide 66 resin, polyamide 612 resin or the like may be added without departing from the gist of the present invention.

Incidentally, gaskets for alkaline batteries cannot be used as products when molding defects such as carbides, surface wrinkles and short shots occur by injection molding. Therefore, the gasket 2 needs to be injection-molded so as not to generate carbides, surface wrinkles or the like. Therefore, the viscosity number of the PA 610 resin composition was quantified at which the flowability of the molten resin is good and no surface wrinkle or the like is generated even when injection molding is carried out within a range of the molten resin temperature (250° C. to 280° C.) at which carbides are not allegedly generated during injection molding. The viscosity number is a value measured in 96% sulfuric acid at a concentration of 1% and a temperature of 25° C. according to ISO 307 standard (JIS K 6933). That is, a solution is prepared by dissolving 250 mg of a polyamide resin in 25 ml of 96 wt % sulfuric acid at 25° C. Only the solution and the solvent are kept at 25° C. by a constant temperature bath, and a time of flow for each of the solution and the solvent is measured by an Ubbelohde viscometer. According to ISO 307 standard, since it is acknowledged that a ratio of the time of flow of the solvent to the time of flow of the solution in the same solvent is equal to a ratio of the viscosity ($\eta 0$) of the solvent to the viscosity ($\eta$) of the solution, the viscosity number (VN) can be calculated according to the following equation.

$$VN=(\eta/\eta 0-1)\times 1/c$$

(in the above equation, $\eta/\eta 0$ represents relative viscosity of the solution in the solvent used and c is a concentration (mg/ml) of the polyamide resin in the solution).

Specifically, the PA 610 resin composition used in the present embodiment has a viscosity number in a range of 80 ml/g or more and 145 ml/g or less. The PA 610 resin composition having a viscosity number lower than 80 ml/g has a low melt viscosity, and therefore the mechanical strength is lowered. For example, the PA 610 resin composition whose viscosity number is lower than 80 ml/g does not satisfy mechanical properties required for the gasket 2 such that the boss portion 22 is broken when inserting the current collector 17 into the boss hole 21 of the gasket 2. In addition, the PA 610 resin composition having a viscosity number exceeding 145 ml/g has too high viscosity at the time of injection molding and its fluidity is lowered, resulting in the occurrence of short shots. In order to obtain the shape of the gasket, the PA 610 resin composition cannot be molded unless the melt viscosity is lowered by raising a temperature of the resin higher than 280° C. which is a decomposition temperature of the resin. A PA 610 resin composition having a viscosity number exceeding 145 ml/g cannot inhibit carbide generation when the melting temperature exceeds 280° C. In the PA 610 resin composition having a viscosity number exceeding 145 ml/g, if the melting temperature is set to 280° C. or lower, the viscosity increases to cause surface wrinkles and short shots, and the surface appearance of a molded article deteriorates.

The viscosity number of the PA 610 resin composition is in the range of 80 ml/g or more and 145 ml/g or less as described above, but taking variations due to material lot into consideration, the viscosity number is preferably 90 ml/g or more and 140 ml/g or less. Furthermore, in order to further reduce defects in appearance and to extend a maintenance cycle of an injection molding machine to perform stable production, the viscosity number of the PA 610 resin composition is particularly preferably 100 ml/g or more and 135 ml/g or less.

The injection molding machine used for manufacturing the gasket 2 of the present embodiment is an injection molding machine used for ordinary injection molding. In the product ejecting step, a lateral type injection molding machine, in which the gasket 2 of the present embodiment is discharged to the outside of the die by falling of the gasket, has advantages that an additional extraction device to extract the gasket 2 is unnecessary and the molding cycle can be shortened.

The injection molding die used in the present embodiment is an injection molding die equipped with a mechanism used for ordinary injection molding, for example, a cavity formed into a gasket shape, a runner through which a melted PA 610 resin composition passes from the injection molding machine to the cavity, a gate that is a boundary between the runner and the cavity, and an ejection mechanism for extracting a gasket cooled and solidified in the cavity.

The injection molding condition used in the present embodiment is a method of setting molding conditions used for injection molding of a general polyamide resin. For example, the temperature of the molten resin is set to 250° C. or higher and 280° C. or lower, and the die temperature is set to 60° C. or higher and 90° C. or lower. The reason why the temperature of the molten resin is set to 250° C. or higher and 280° C. or lower is that if the temperature of the molten resin is too low, the material does not spread throughout the cavity and short shots may occur, and if the temperature of the molten resin is too high, generation of carbides may increase. The reason why the die temperature is set to 60° C. or higher and 90° C. or lower is that if the die temperature is too low, the degree of crystallinity is lowered and the long-term stability of the dimensions is reduced, so that liquid leakage may occur, and if the die temperature is too high, the time for the molten resin to be cooled and solidified is prolonged to remarkably lower the productivity. The injection speed and holding pressure can be appropriately selected while checking the dimension and appearance of a gasket molded article.

The runner is selected from any of a cold runner method in which a portion molded by a runner is cooled, solidified and discharged for every injection molding step, a hot runner method in which a resin in a runner is always maintained in a molten state, and a semi-hot runner method in which a resin in a runner on the side close to the injection molding machine is always molten and only the portion molded by the runner on the side close to the cavity (hereinafter referred to as a runner molded portion) is cooled, solidified and discharged. Which runner method is adopted can be selected appropriately based on the quality level required for gasket and productivity.

When the injection molding die of the cold runner method and the semi-hot runner method is selected, the runner molded portion is discharged, but the runner molded portion is pulverized to a size similar to a commercially available PA 610 resin composition pellet using a pulverizer, and thereby, the runner molded portion can be utilized as a material for a gasket composed of a regenerated material.

Although a viscosity number of the regenerated material may possibly be reduced due to thermal degradation, it is found that the quality of the gasket is not affected when the viscosity number is 80 ml/g or more. Therefore, the runner discharged at the time of injection molding the commercially available PA 610 resin composition in which the viscosity number of the PA610 resin is within the specified range is pulverized to the same size as a commercially available material by a pulverizer. Then, the regenerated material from which metal is reliably removed with a strong magnet or the like can be used as it is as a gasket molding material. Further, as the gasket molding material, all of the regenerated material can be used, or a regenerated material and a commercially available material can be blended at a certain ratio and used.

When the regenerated material is used as a gasket molding material, it is possible to employ a method of repeatedly using the regenerated material and discarding the regenerated material when the viscosity number of the runner molded portion becomes less than 80 ml/g. When the regenerated material and the commercially available material are blended at a certain ratio, it is also possible to select a method of previously determining a blending ratio, at which the viscosity number of the runner discharged by injection molding does not become less than 80 ml/g, and continuously producing a gasket by constructing a system for blending the regenerated material and the commercially available material with use of a two material mixer capable of maintaining the ratio and feeding the blended material to an injection molding machine.

The alkaline battery of the present embodiment is completed as follows: the negative electrode terminal 13 and the gasket 2 provided with the current collector 17 are incorporated into the opening of the positive electrode can 11 storing the positive electrode material 15, the separator 12, the electrolytic solution and the negative electrode material 16, and then the opening of the positive electrode can 11 and the standing portion 23 of the gasket 2 are caulked.

The gasket 2 may be used in a state of appropriately absorbing water in order to prevent the boss hole 21 from being broken when the current collector 17 is press-fitted into the boss hole 21, or a gasket molded by injection molding may be used as it is.

The gasket for an alkaline battery of the present invention is not limited to the embodiment illustrated by the above description and drawings, and various modifications can be made within the scope of the gist of the present invention. Further, the gasket for an alkaline battery of the present invention is formed by injection molding, but the kind of the injection molding die used for preparing the gasket is not limited. For example, as described above, in the injection molding die, a die of the cold runner method can be used when giving priority to stabilizing gasket quality, a die of the hot runner method can be used when giving priority to productivity, and a die of the semi-hot runner method can be used when considering a balance between the quality and the productivity.

Furthermore, the gasket for an alkaline battery of the present invention is not limited to be applied to the cylindrical alkaline battery shown in FIG. 1, but can also be applied to sealing parts for ordinary cylindrical manganese batteries, rectangular or button type batteries, or the like. The gasket of the present invention can also be applied to a resin component for insulation of a battery in which the electrolytic solution is alkaline, for example, a nickel-metal hydride battery. Examples of the nickel-metal hydride battery include a cylindrical nickel-metal hydride secondary battery and a nickel-metal hydride secondary battery used in a hybrid vehicle or an electric vehicle. Further, the gasket of the present invention can also be applied to alkaline storage batteries.

Further, it is also possible that the gasket for an alkaline battery of the present invention, which is molded using the PA 610 resin composition, is regenerated to be molded into a gasket for an alkaline battery again.

EXAMPLES

Examples and comparative examples of gaskets each prepared using PA 610 resin compositions each having a different viscosity number of PA 610 resin are shown below. The present invention is not limited to the following examples without departing from its gist. In the examples and comparative examples, the following PA 610 resins each having a different viscosity number are used. Also, as a regenerated material of the PA 610 resin composition, a runner molded portion molded by injection molding a PA 610 resin having a viscosity number of 110 ml/g was used. In each of examples and comparative examples, 0.3 parts by weight of magnesium silicate was added with respect to 100 parts by weight of PA 610 resin (including regenerated material) as a crystal nucleating agent, and 0.5 parts by weight of magnesium stearate was added with respect to 100 parts by weight of PA 610 resin (including regenerated material) as a release agent.

[Polyamide 610 Resin Composition]

Example 1

Viscosity number of PA 610 resin: 145 ml/g
Molten resin temperature of PA 610 resin composition at gasket production: 280° C.

Example 2

Viscosity number of PA 610 resin: 135 ml/g
Molten resin temperature of PA 610 resin composition at gasket production: 270° C.

Example 3

Viscosity number of PA 610 resin: 120 ml/g
Molten resin temperature of PA 610 resin composition at gasket production: 270° C.

Example 4

Viscosity number of PA 610 resin: 110 ml/g
Molten resin temperature of PA 610 resin composition at gasket production: 260° C.

Example 5

Viscosity number of PA 610 resin: 100 ml/g
Molten resin temperature of PA 610 resin composition at gasket production: 260° C.

Example 6

Viscosity number of PA 610 resin: 90 ml/g
Molten resin temperature of PA 610 resin composition at gasket production: 250° C.

Example 7

Viscosity number of PA 610 resin: 80 ml/g
Molten resin temperature of PA 610 resin composition at gasket production: 250° C.

Comparative Example 1

Viscosity number of PA 610 resin: 150 ml/g
Molten resin temperature of PA 610 resin composition at gasket production: 290° C.

Comparative Example 2

Viscosity number of PA 610 resin: 70 ml/g
Molten resin temperature of PA 610 resin composition at gasket production: 250° C.

Example 8

PA 610 resin: 100 parts by weight
PA 610 resin of regenerated material composed of runner molded portion: 0 parts by weight
Viscosity number of PA 610 resin: 110 ml/g
Molten resin temperature of PA 610 resin composition at gasket production: 270° C.

Example 9

PA 610 resin: 0 parts by weight
PA 610 resin of regenerated material composed of runner molded portion: 100 parts by weight (number of regeneration times: 1)
Viscosity number of PA 610 resin before regeneration: 110 ml/g
Molten resin temperature of PA 610 resin composition at gasket production: 270° C.

Example 10

PA 610 resin: 0 parts by weight
PA 610 resin of regenerated material composed of runner molded portion: 100 parts by weight (number of regeneration times: 2)
Viscosity number of PA 610 resin before regeneration: 110 ml/g
Molten resin temperature of PA 610 resin composition at gasket production: 270° C.

Example 11

PA 610 resin: 0 parts by weight
PA 610 resin of regenerated material composed of runner molded portion: 100 parts by weight (number of regeneration times: 3)
Viscosity number of PA 610 resin before regeneration: 110 ml/g
Molten resin temperature of PA 610 resin composition at gasket production: 270° C.

Example 12

PA 610 resin: 10 parts by weight
PA 610 resin of regenerated material composed of runner molded portion: 30 parts by weight (number of regeneration times: 1)
PA 610 resin of regenerated material composed of runner molded portion: 30 parts by weight (number of regeneration times: 2)
PA 610 resin of regenerated material composed of runner molded portion: 30 parts by weight (number of regeneration times: 3)
Viscosity number of PA 610 resin before regeneration: 110 ml/g Molten resin temperature of PA 610 resin composition at gasket production: 270° C.

Example 13

PA 610 resin: 75 parts by weight
PA 610 resin of regenerated material composed of runner molded portion: 12.4 parts by weight (number of regeneration times: 1)
PA 610 resin of regenerated material composed of runner molded portion: 6.3 parts by weight (number of regeneration times: 2)
PA 610 resin of regenerated material composed of runner molded portion: 6.3 parts by weight (number of regeneration times: 3)
Viscosity number of PA 610 resin before regeneration: 110 ml/g
Molten resin temperature of PA 610 resin composition at gasket production: 270° C.

As described in the above embodiment, the viscosity numbers shown in the examples and the comparative examples are those measured at 25° C. by dissolving 1% of PA 610 resin in a 96% concentrated sulfuric acid solvent according to ISO 307 standard (JIS K 6933). These materials are dried for 5 hours or more in a dryer at an ambient temperature of 80° C. immediately before injection molding.

Evaluations of each gasket produced using the resin composition and the molten resin temperature shown in each of the examples and the comparative examples included (1) moldability (short shots, burrs, release failures, etc.), (2) appearance of gasket (surface wrinkles, carbidse), (3) presence or absence of cracks/fracture in boss portion when inserting current collector, and (4) evaluation of explosion-proof safety valve operation (safety valve operating time).

SE-100 (mold clamping force 980 kN, screw diameter 32 mm) manufactured by Sumitomo Heavy Industries, Ltd. was used as an injection molding machine for gasket molding in order to evaluate the moldability of the gasket and the like. A die for molding gaskets for AA alkaline batteries was used. The die temperature was unified to 70° C., and a sample was obtained by adopting the optimum conditions according to the characteristics of the resin and the appearance of the molded article in other major molding processing conditions.

(Test Method 1) Moldability

A gasket for an AA alkaline battery was molded using the resin composition and the molten resin temperature shown in each of the examples and comparative examples, 100 gaskets made under each condition were taken out and visually checked, and the case where the gasket can be molded without occurrence of molding defects such as short shots or burrs was rated as "good". When the gasket sample having short shots or burrs was found, the sample was judged to be "poor".

(Test Method 2) Appearance of Gasket

Regarding the gasket for an AA alkaline battery molded using the material and molten resin temperature shown in each of the examples and comparative examples, 100 gasket samples were arbitrarily taken out for each condition, and the appearance of the gasket was observed with a magnifying glass of a magnification of 10 times. The case where the shape of the thin wall portion was normal and there were no surface wrinkles and carbides at all was rated as "good" assuming that the appearance is normal. The case where there was such an appearance defect that surface wrinkles or carbides were generated to cause concerns about battery performance was rated as "not appropriate". In addition, regarding the molded gasket for an AA alkaline battery, 10000 gaskets were arbitrarily taken out, defects in the thin wall portion were checked using a surface image inspection apparatus. Those with a defect occurrence rate of 1% or less were rated as "good", and when the defect occurrence rate was more than 1%, those were rated as "not appropriate". In the two kinds of appearance inspection methods, those which achieved good results in both of inspection methods were judged to be "good", and those which led to the level of "not appropriate" in any one of the inspection methods were judged to be "poor".

(Test Method 3) Presence or Absence of Cracks in Boss Portion

Regarding each molded gasket for an AA alkaline battery, 100 gaskets were arbitrarily taken out, and a metal rod thicker by 20% than the current collector normally used was inserted into the boss portion, and those in which cracks or fractures were not generated were rated as "good", and those in which cracks or fractures were generated was rated as "poor".

(Test Method 4) Evaluation of Explosion-Proof Safety Valve Operation

A time before the explosion-proof safety valve operates was evaluated when incorrect usage such as short-circuit of an alkaline battery with a gasket introduced thereinto was made. Specifically, a gasket for an AA alkaline battery was prepared including the polyamide 610 resin described in the examples and the comparative examples as a material. The prepared gasket was caused to absorb water under an environment at a temperature of 25° C. and a humidity of 50% to a moisture percentage at which the water absorption rate reached equilibrium. Then, using a breakage pressure measuring machine prepared according to Japanese Patent No. 5659180, the time from the start of pressurization until the operation of the safety valve of the gasket (the gasket thin wall portion was ruptured) was measured. This experiment was repeated 10 times on each of gaskets of the examples and comparative examples, and the average value of the gaskets was obtained. The breakage pressure measuring machine (Japanese Patent No. 5659180) includes a gasket holder including a hydraulic working chamber which holds a gasket inside and which applies hydraulic pressure to a lower surface of the gasket and an oil discharging chamber formed opposed to an upper surface of the gasket; a hydraulic generator in which oil is supplied to the hydraulic working chamber of the gasket holder to apply a hydraulic pressure to the lower surface side of the gasket, and oil discharged to the oil discharging chamber through the rupture of the gasket by the applied hydraulic pressure is recovered and a hydraulic pressure is generated for supplying the oil to the hydraulic working chamber again; and a pressure gauge for measuring a hydraulic pressure applied to the lower surface side of the gasket. The hydraulic generator includes an air cylinder section including a piston rod portion that moves in the axial direction with pneumatic pressure supplied from a pneumatic pressure source; and a hydraulic cylinder section having a hydraulic pressure chamber in which a part of the piston rod portion is disposed movably in the axial direction, the hydraulic cylinder section pressurizing oil by the movement of the piston rod portion to supply the oil to the hydraulic working chamber of the gasket holder so as to apply hydraulic pressure to the lower surface side of the gasket and recovering, to the hydraulic pressure chamber, the oil discharged to the oil discharging chamber.

[Evaluation Results]

In each of Examples 1 to 7, moldability (short shots, burrs) according to Test Method 1, appearance of gasket (surface wrinkles, carbides) according to Test Method 2, and presence or absence of cracks/fractures (generation rate of cracks in boss portion) according to Test Method 3 were all evaluated as "good". It was also verified that in evaluation of explosion-proof safety valve operation according to Test Method 4, the safety valve was normally operated (the thin wall portion of the gasket was ruptured) within an appropriate period of time against a predetermined breakage pressure. As a result, it was found that the gaskets made of the PA 610 resin compositions of Examples 1 to 7 are excellent in mass productivity, and not only the gaskets satisfy the requirements for gaskets for alkaline batteries, but also the alkaline batteries including the gaskets have a long lifetime and high safety.

In Comparative Example 1, short-shots occurred in moldability (short shots, burrs) according to Test Method 1, surface wrinkles or carbides were generated in appearance of gasket (surface wrinkles, carbides) according to Test Method 2, and cracks were generated in presence or absence of cracks/fractures (generation rate of cracks in boss portion) according to Test Method 3, and all were evaluated as "poor". In addition, in evaluation of explosion-proof safety valve operation according to Test Method 4, the safety valve operation time was long. From the above, it was found that the gasket of Comparative Example 1 was inferior in moldability, appearance, and mechanical strength. As a result, it was found that the gasket made of the PA 610 resin composition of Comparative Example 1 has many problems in terms of mass productivity and does not satisfy the requirements for gaskets for alkaline batteries, and in the alkaline battery including this gasket, a long lifetime and safety cannot be expected.

In Comparative Example 2, moldability (short shots, burrs) according to Test Method 1 was evaluated as "poor" because burrs were generated in most gaskets. Appearance of gasket (surface wrinkles, carbides) according to Test Method 2 was evaluated as "good" because the surface wrinkles or carbides were not generated. Presence or absence of cracks/fractures (generation rate of cracks in boss portion) according to Test Method 3 was evaluated as "poor" because cracks and fractures were generated. In addition, in evaluation of explosion-proof safety valve operation according to Test Method 4, the safety valve operation time was short. From the above, it was found that the gasket of Comparative Example 2 is inferior in moldability and mechanical strength. As a result, it was found that the gasket made of the PA 610 resin composition of Comparative Example 2 has many problems in terms of mass productivity and does not satisfy the requirements for gaskets for alkaline batteries, and in the alkaline battery including this gasket, a long lifetime and safety cannot be expected.

In each of Examples 8 to 13, moldability (short shots, burrs) according to Test Method 1, appearance of gasket (surface wrinkles, carbides) according to Test Method 2, and presence or absence of cracks/fractures (generation rate of cracks in boss portion) according to Test Method 3 were all evaluated as "good". It was also confirmed that in evaluation of explosion-proof safety valve operation according to Test Method 4, the safety valve was normally operated (the thin wall portion of the gasket was ruptured) within an appropriate period of time against a predetermined breakage pressure. As a result, as is apparent from the results of Examples 9 to 13, it was found that the gaskets prepared using the regenerated material of the PA 610 resin composition are also excellent in mass productivity, and not only the gaskets satisfy the requirements for gaskets for alkaline batteries, but also the alkaline batteries including the gaskets have a long lifetime and high safety.

The test results of Examples 1 to 7 and Comparative Examples 1 to 2 are shown in the following Table 1, and the test results of Examples 8 to 13 are shown in Table 2.

TABLE 1

|  | Example 1 | Example 2 | Example 3 | Example 4 | Example 5 | Example 6 | Example 7 | Comparative Example 1 | Comparative Example 2 |
|---|---|---|---|---|---|---|---|---|---|
| Viscosity number of PA610 resin (ml/g) | 145 | 135 | 120 | 110 | 100 | 90 | 80 | 150 | 70 |
| Resin temperature during gasket production (° C.) | 280 | 270 | 270 | 260 | 260 | 250 | 250 | 290 | 250 |
| Moldability | Good | Good | Good | Good | Good | Good | Good | Poor | Poor |
| Appearance of gasket | Good | Good | Good | Good | Good | Good | Good | Poor | Good |
| Crack test | Good | Good | Good | Good | Good | Good | Good | Poor | Poor |
| Safety valve operation time (sec) | 9.25 | 9.15 | 9.02 | 8.94 | 8.80 | 8.75 | 8.63 | 10.40 | 7.43 |

TABLE 2

|  | Example 8 | Example 9 | Example 10 | Example 11 | Example 12 | Example 13 |
|---|---|---|---|---|---|---|
| PA610 resin (parts by weight) | 100 | 0 | 0 | 0 | 10 | 75 |
| Regeneration material Regeneration: one time (parts by weight) | 0 | 100 | 0 | 0 | 30 | 12.4 |

TABLE 2-continued

| | Example 8 | Example 9 | Example 10 | Example 11 | Example 12 | Example 13 |
|---|---|---|---|---|---|---|
| Regeneration material Regeneration: two times (parts by weight) | 0 | 0 | 100 | 0 | 30 | 6.3 |
| Regeneration material Regeneration: three times (parts by weight) | 0 | 0 | 0 | 100 | 30 | 6.3 |
| Moldability | Good | Good | Good | Good | Good | Good |
| Appearance of gasket | Good | Good | Good | Good | Good | Good |
| Crack test | Good | Good | Good | Good | Good | Good |
| Safety valve operation time (sec) | 8.80 | 8.78 | 8.76 | 8.75 | 8.78 | 8.79 |

From the results of the above examples and comparative examples, it was found that the PA 610 resin composition having a viscosity number in the range of 80 ml/g or more and 145 ml/g or less is excellent in mass productivity. It was also found that the gaskets made of the PA 610 resin composition satisfy the requirements for gaskets for alkaline batteries, and the alkaline batteries including the gaskets have a long lifetime and high safety.

In addition, it was found that by using a regenerated material in the polyamide 610 resin composition, the resulting gaskets satisfy the long lifetime and mechanical properties required for alkaline batteries while the viscosity during melting at the proper melting temperature of the polyamide 610 resin composition can be lowered. Further, since a regenerated material obtained by processing a runner molded portion or the like, which becomes unnecessary in the injection molding process, into a pellet shape by pulverizing process is used, the cost can be reduced. In particular, by using a regenerated material used for injection molding twice or more, fluidity can be easily adjusted.

In the case of manufacturing a gasket for an alkaline battery, by setting the molten resin temperature of the polyamide 610 resin composition during injection molding to 250 to 280° C., gaskets having no carbide and excellent in mechanical properties can be manufactured.

INDUSTRIAL APPLICABILITY

The gasket for a battery of the present invention can safely prolong the lifetime of an alkaline battery, and can also be favorably applied to a nickel-metal hydride battery including a high alkaline aqueous solution as an electrolytic solution.

REFERENCE SIGNS LIST

1: Alkaline battery
2: Gasket
11: Positive electrode can
12: Separator
13: Negative electrode terminal
14: Positive electrode terminal
15: Positive electrode material
16: Negative electrode material
17: Current collector
17a: Head portion
21: Boss hole
22: Boss portion
23: Standing portion
24: Isolation wall portion
25: Thin wall portion

What is claimed is:

1. A gasket for an alkaline battery, the gasket being formed by injection molding a resin composition and having a thin wall portion in part, wherein
   the resin composition is a polyamide 610 resin composition containing a polyamide 610 resin as a main component and a molding aid containing a crystal nucleating agent and a release agent, the polyamide 610 resin having a viscosity number in a range of 80 ml/g or more and 145 ml/g or less;
   the polyamide 610 resin composition is one in which a regenerated material of the same kind of a polyamide 610 resin composition once used for injection molding is used partially or a whole of the regenerated material is used as a material;
   the regenerated material is a runner molded portion discharged at the time of injection molding of the polyamide 610 resin composition; and
   the viscosity number of the runner molded portion is 80 ml/g or more.

2. The gasket for an alkaline battery according to claim 1, wherein the regenerated material is a regenerated material used for injection molding twice or more.

3. A method for manufacturing a gasket for an alkaline battery, the gasket having a thin wall portion in part, the method comprising
   injection molding, into the gasket, a polyamide 610 resin composition containing a polyamide 610 resin as a main component and a molding aid containing a crystal nucleating agent and a release agent, the polyamide 610 resin having a viscosity number in a range of 80 ml/g or more and 145 ml/g or less;
   the polyamide 610 resin composition is obtained by using partially a regenerated material of the same kind of a polyamide 610 resin composition once used for injection molding or using a whole of the regenerated material is used as a material;
   the regenerated material is a runner molded portion discharged at the time of injection molding of the polyamide 610 resin composition; and
   the runner molded portion is used repeatedly as the gasket molding material and discarded when the viscosity number of the runner molded portion discharged during the injection molding becomes less than 80 ml/g.

4. The method for manufacturing a gasket for an alkaline battery according to claim 3, wherein
   a molten resin temperature of the polyamide 610 resin composition during injection molding is 250 to 280° C.

* * * * *